(12) United States Patent
Fausten et al.

(10) Patent No.: US 6,308,517 B1
(45) Date of Patent: Oct. 30, 2001

(54) AUTOMATIC CHARGING PRESSURE CONTROL AND AUTOMATIC EXHAUST GAS RECIRCULATION CONTROL SYSTEM IN AN INTERNAL-COMBUSTION ENGINE, PARTICULARLY A DIESEL ENGINE

(75) Inventors: Hans Fausten, Winterbach; Nicholas Fekete, Fellbach; Thomas Muehleisen, Hattenhofen; Stefan Pischinger, Aachen; Siegfried Weber, Stuttgart, all of (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 09/232,703

(22) Filed: Jan. 19, 1999

(30) Foreign Application Priority Data

Jan. 16, 1998 (DE) .............................................. 198 01 395

(51) Int. Cl.⁷ .................................................... F02B 33/44
(52) U.S. Cl. ............................................ 60/605.2; 60/602
(58) Field of Search .................................... 60/602, 605.2

(56) References Cited

U.S. PATENT DOCUMENTS

| 4,177,777 | * | 12/1979 | Maruyama et al. |  |
| 4,484,445 | * | 11/1984 | Gillbrand | 60/605.2 |
| 4,637,210 | * | 1/1987 | Yamamoto | 60/602 |

FOREIGN PATENT DOCUMENTS

| 37 39 244 | 6/1988 | (DE) . |
| 44 94 929 | 10/1995 | (DE) . |
| 196 15 545 | 6/1997 | (DE) . |
| 0 747 585 | 12/1996 | (EP) . |
| 8-270454 | 10/1996 | (JP) . |

* cited by examiner

Primary Examiner—Noah P. Kamen
(74) Attorney, Agent, or Firm—Crowell & Moring LLP

(57) ABSTRACT

A system for automatic charging pressure control using an exhaust gas turbocharger with a variably adjustable turbine cross-section and for automatic exhaust gas recirculation control in the case of an internal-combustion engine, particularly a diesel engine. An automatic control system has a first controller which has an output for the variation of the turbine cross-section of the exhaust gas turbocharger. The command variable for the automatic exhaust gas recirculation control in a first low load-rotational speed range is the air flow rate in the intake pipe. The command variable for the automatic charging pressure control in a second higher load-rotational speed range is the charging pressure in the intake pipe. For the automatic exhaust gas recirculation control, an exhaust gas recirculation pipe connects the exhaust gas pipe with the suction pipe. In the case of this system, for achieving the lowest possible pollutant emission while simultaneously minimizing fuel consumption, exhaust gas recirculation rates which are as precise as possible are defined in the lower load-rotational speed range, and a charging pressure which is as precise as possible is defined in the upper load-rotational speed range via a corresponding automatic control.

22 Claims, 1 Drawing Sheet

AUTOMATIC CHARGING PRESSURE CONTROL AND AUTOMATIC EXHAUST GAS RECIRCULATION CONTROL SYSTEM IN AN INTERNAL-COMBUSTION ENGINE, PARTICULARLY A DIESEL ENGINE

BACKGROUND AND SUMMARY OF THE INVENTION

This application claims the priority of German Application No. 198 01 395.7, filed Jan. 16, 1998, the disclosure of which is expressly incorporated by reference herein.

The invention relates to a system for the automatic charging pressure control using an exhaust gas turbocharger with a variably adjustable turbine cross-section and for the automatic exhaust gas recirculation control in an internal-combustion engine, particularly a diesel engine. The engine has an air flow sensor connected in front of the compressor of the exhaust gas turbocharger in the suction pipe. An exhaust gas recirculation pipe connects the exhaust gas pipe with the suction pipe. An automatic control device, in a first low load-rotational speed range, automatically controls the exhaust gas recirculation and, in a second higher load-rotational speed range, automatically controls the charging pressure in the suction pipe by a corresponding variation of the turbine cross-section.

In the case of an automatic control system of this type known from European Patent Document EP-A-0 747 585, the charging pressure is controlled in the first lower range by way of a characteristic diagram and, in the second higher range, this charging pressure is automatically controlled by means of the characteristic diagram values as the desired values. Independently thereof, in the first range, the exhaust gas recirculation is automatically controlled using an exhaust gas recirculation valve and is switched off in the second range.

Also in the case of other known systems, two control circuits for the exhaust gas recirculation and the charging pressure are only used independently of one another, in which case one control circuit is not controlled automatically, that is, it is operated only in a controlled manner when the other is operated.

Furthermore, particularly in the case of diesel engines, being able to implement sufficiently high exhaust gas recirculation rates by way of the available exhaust gas recirculation flow cross-sections presents a problem. For solving this problem, in a known manner, a throttle valve is used for the intake air throttling and for increasing the exhaust gas recirculation delivery gradient.

The known arrangement, in the case of which a control of the charging pressure as well as an automatic control of the charging pressure is provided, in addition to the automatic control of the exhaust gas recirculation which is independent thereof, results in a relatively high-expenditure and cost-intensive solution. Because of the independent automatic control of the charging pressure and the exhaust gas recirculation, there is the risk that the two systems operate against one another and thus lead to unsatisfactory results with respect to the exhaust gas and the performance.

It is therefore an object of the present invention to provide a system of the above-mentioned type which can be implemented in a simpler manner and at lower cost, and which, in all operating ranges, leads to reliable and optimal values with respect to the exhaust gas and the performance.

According to the invention, this object is achieved in that the automatic control system has a first controller which has a first controller output for the variation of the turbine cross-section, the command variable for the automatic exhaust gas recirculation control in the first low load-rotational speed range being the air flow rate in the intake pipe, and the command variable for the automatic charging pressure control in the second higher load-rotational speed range being the charging pressure in the intake pipe.

The invention advantageously utilizes the variable cross-section of the turbine of the exhaust gas turbocharger for generating the required exhaust gas recirculation delivery gradient while the exhaust gas recirculation flow cross-section is given. The automatic control of this variable flow cross-section therefore results in the setting of suitable exhaust gas recirculation rates. In the higher load and/or rotational speed range, the air flow rate command variable must only be replaced by the charging pressure command variable in order to switch over to an automatic charging pressure control. In this case, the recognition is utilized that, in the low load-rotational speed range, an automatic exhaust gas recirculation control which is as precise as possible and, in the upper load and/or rotational speed range, a charging pressure which is automatically controlled as precisely as possible are prerequisites for achieving the object of a pollutant emission which is as low as possible while simultaneously minimizing the fuel consumption.

By means of the measures described herein, advantageous further developments and improvements of the system according to the invention can be implemented.

When still in the second higher load-rotational speed range, in order to implement an automatic exhaust gas recirculation control in addition to the automatic control of the charging pressure, an exhaust gas recirculation valve is provided in the exhaust gas recirculation pipe which can be set by a second controller constructed as an exhaust gas recirculation controller. This second controller also has the air flow rate as its command variable, as in the case of the automatic control of the exhaust gas recirculation by the first controller in the first low load-rotational speed range.

Since, in principle, the second controller is not required in the first low load-rotational speed range, devices are expediently provided for switching off or deactivating the second controller during the transition from the second to the first range. During the switching-off or deactivating of the second controller, the exhaust gas recirculation valve preferably retains its actual control value-its actual control signal. This is true at least when a definable applicable value for the control value or the control signal has been exceeded.

When the first controller in the first load and/or rotational speed range reaches its minimal output, it can no longer control the exhaust gas recirculation. For this case, devices are advantageously provided for switching off or deactivating this first controller and simultaneously switching on or activating the second controller.

The air flow rate sensor is preferably constructed as a hot-film air flow rate sensor.

The turbine of the exhaust gas turbocharger arranged in the exhaust gas pipe preferably has a guide blade adjusting device for the variation of the turbine cross-section.

For sensing the charging pressure, a pressure sensor is connected behind the compressor of the exhaust gas turbocharger.

For dividing the operating range into the two load-rotational speed ranges, a characteristic curve is preferably provided which is a function of the rotational engine speed and of the engine load (or injection). This characteristic curve expediently has a hysteresis in order to prevent a back and forth switching between the ranges in the boundary area.

DETAILED DESCRIPTION OF THE DRAWINGS

Figure 1:
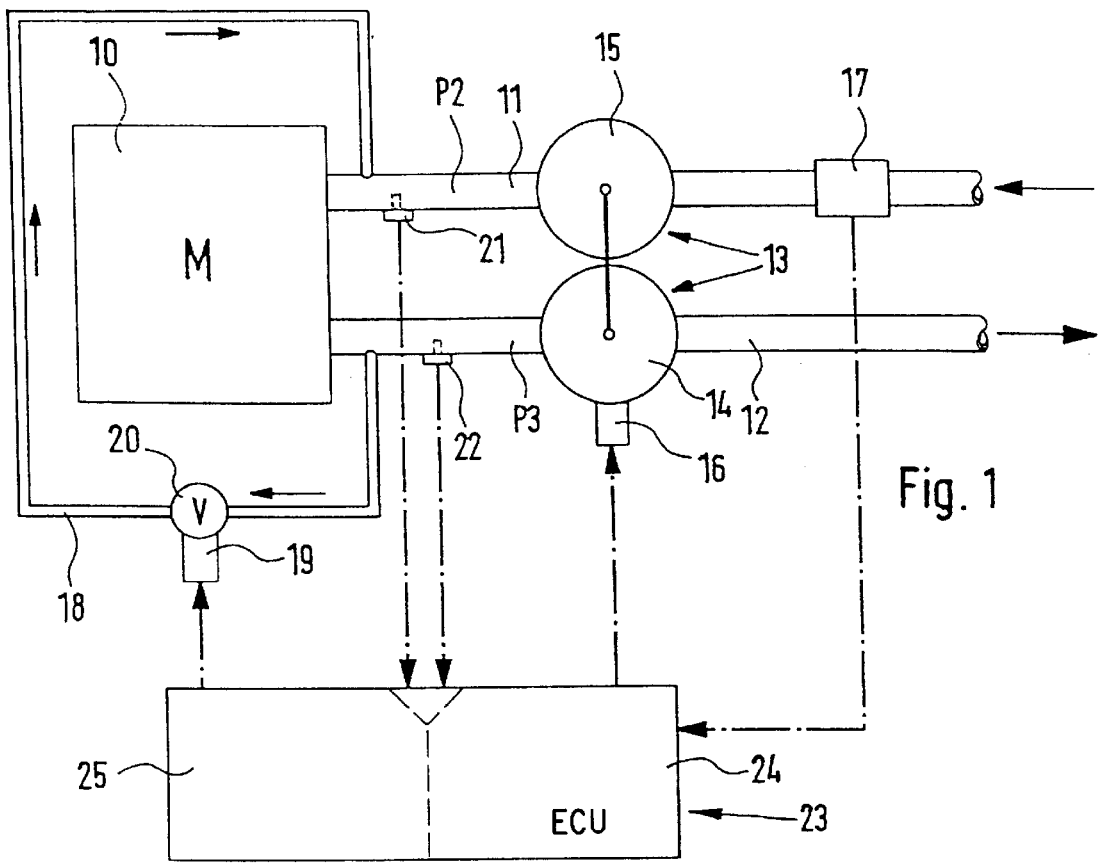
FIG. 1 is a schematic representation of a diesel engine which has an exhaust gas recirculation system and is provided with an exhaust gas turbocharger according to the present invention.

In the case of the embodiment illustrated in FIG. 1, a schematically illustrated diesel engine 10 is provided in a conventional manner with an intake pipe 11 for air and an exhaust gas pipe 12 for discharging exhaust gases. An exhaust gas turbocharger 13 consists of a turbine 14 which is arranged in the exhaust gas pipe 12 and which drives a compressor 15 arranged in the intake pipe 11. In a manner not shown in detail, the turbine 14 has a guide blade adjusting device in order to be able to vary the turbine cross-section and the turbine output. An electric or pneumatic control element 16 is used for adjusting and for operating the guide blade adjusting device. In principle, the guide blade adjusting device may also be replaced by another known device for varying the turbine cross-section.

The air taken into the intake pipe 11 first flows through an air flow rate sensor 17 for detecting the taken-in air flow rate. This air flow rate sensor 17 is expediently constructed as a hot-film air flow rate sensor and is connected in front of the compressor 15 of the exhaust gas turbocharger 13.

By way of an exhaust gas recirculation pipe 18, the exhaust gas pipe 12 is connected with the intake pipe 11. A proportional valve 20, which can be controlled by an electric or pneumatic control element 19, is switched into this exhaust gas recirculation pipe 18. In the case of an electric control element 19, this proportional valve used as the exhaust gas recirculation valve is triggered by a control voltage whose pulse width repetition rate can be varied between 0 and 100%.

For detecting the charging pressure P2, a first pressure sensor 21 is arranged between the compressor 15 and the diesel engine 10, while a second pressure sensor 22 is arranged in the exhaust gas pipe 12 between the diesel engine 12 and the turbine 14 for measuring the pressure P3 in front of the turbine 14.

For purposes of simplification, the conventional fuel injection system which is required for the diesel engine 10 is not shown.

An automatic electronic control unit 23 controls the control elements 16 and 19 for adjusting the guide blades and for adjusting the proportional valve 20, the measuring values of the air flow rate sensor 17 and of the pressure sensors 21, 22 being fed to this electronic control unit 23. This automatic electronic control unit 23 may be a component of a central electronic system of the engine or of the vehicle.

Figure 2:
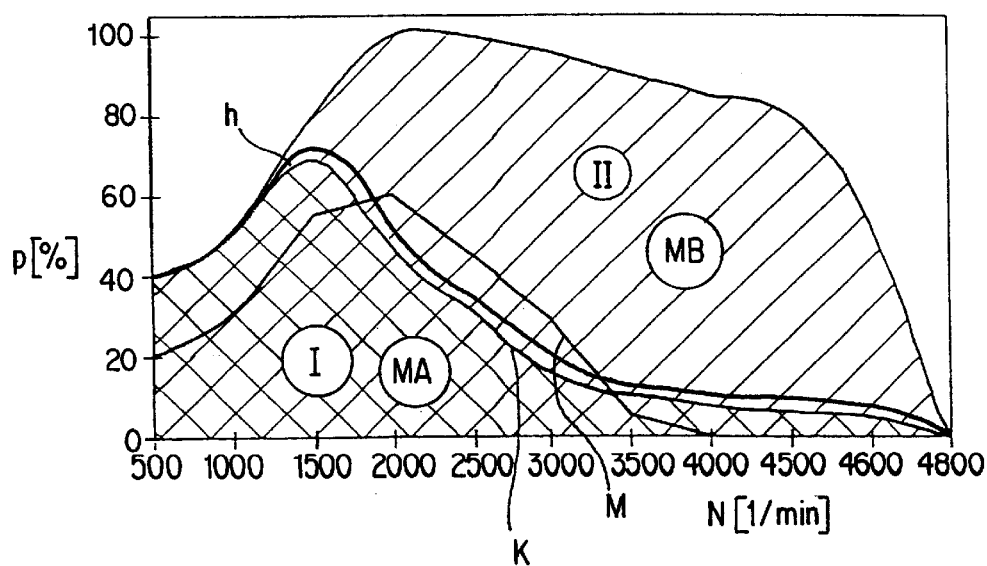
FIG. 2 is a diagram for explaining the two load-rotational speed ranges in accordance with the present invention.

The basic idea of the automatic control according to the invention consists of the fact that first the whole operating range of the diesel engine 10 according to FIG. 2 is divided by means of a characteristic curve K into two ranges I and II, range I representing a first low load-rotational speed range, and ran II representing a higher load-rotational speed range. This applicable characteristic curve K has a hysteresis h and is a function of the rotational engine speed N and the engine load P. Instead of the engine load, the injection quantity may also be provided. This is based on the consideration that, in the double-hatched range I (low load-rotational speed), for implementing minimal pollutant emissions, the desired exhaust gas recirculation rate should be automatically controlled intransiently as well as transiently in a manner which is as precise and as rapid as possible. By contrast, in the single-hatch range II, the fast automatic controlling of the desired charging pressure is the most important prerequisite for reducing the black smoke emission. Independently of these two ranges, an overall area is divided into a MA and a MB range by divider M. In the MB range, no automatic exhaust gas control is required or carried out, while such an exhaust gas recirculation is useful and is therefore carried out in the MA range. The characteristic curve K therefore has no direct significance with respect to the automatic exhaust gas control.

By means of the variable and adjustable cross-section in the turbine 14 of the exhaust gas turbocharger, the required exhaust gas recirculation delivery gradient can be adjusted while the exhaust gas recirculation flow cross-section is given. This concept is based on the fact that, when the turbine cross-section is reduced, the pressure P3 in front of the turbine 14 increases more than the pressure P2 behind the compressor. Thus, when the turbine cross-section is reduced by way of the guide blade adjustment, the exhaust gas recirculation is increased.

A first controller 24 in the automatic electronic control unit 23 acts upon the guide blade adjustment by way of the control element 16 and automatically controls this guide blade adjustment. In range I, the air flow rate, which is measured in the air flow rate sensor 17, is used as the command variable. In this first range, this leads to an automatic exhaust gas circulation control by way of the guide blade adjustment. During the transition from range I to range II, a change-over takes place from the air flow rate command variable to the charging pressure P2 command variable. Thus a change-over takes place from the automatic exhaust gas recirculation control to the automatic charging pressure control. If a transition to range I follows again, a change-over takes place again back to the air flow rate command variable and thus to the exhaust gas recirculation. By means of the hysteresis h of the characteristic curve K, a constant back and forth switching is prevented from taking place in an operating range in the proximity of the characteristic curve K.

The exhaust gas recirculation is automatically controlled by means of the air flow or air flow rate also outside range I. Outside range I, this automatic control takes place by means of a second controller 25 which acts upon the control element 19 of the proportional valve 20 serving as the exhaust gas recirculation valve. Since the range I and the MA recirculation range in FIG. 2 are very similar, in some designs, the second controller 25 and the proportional valve 20 can be eliminated.

If the second controller 25 and the proportional valve 20 are provided, during the transition from range II to range I, the following change-over criterion is defined for the transition from the automatic charging pressure control (P2) to the automatic air flow rate control. If the triggering pulse-width repetition rate at the control element 19 of the proportional valve 20 is larger than an applicable value, for example, 90% of the maximally permissible value, the pulse width repetition rate is frozen to its actual value; that is, the proportional valve 20 retains its actual control value. If the first controller 24 now reaches its minimal stop, as of which a further guide blade adjustment is no longer possible, it is switched off or deactivated, and the second controller is switched on or activated again in order to maintain the automatic exhaust gas recirculation control. In principle, during the transition from range II to range I, the proportional valve 20 can also be set to a definable value.

The system according to the invention is provided particularly for diesel engines but may correspondingly also be applied to Otto engines or other engines.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for automatic charging pressure control and automatic exhaust gas recirculation control in an internal-combustion engine, said system comprising:
   an exhaust gas turbocharger with a turbine having a variable adjustable cross-section and a compressor, said compressor being connected in line with a suction pipe and said turbine being connecting in line with an exhaust gas pipe;
   an air flow sensor connected upstream of said compressor in the suction pipe;
   a pressure sensor connected in line with said suction pipe for measuring charging pressure and an exhaust gas recirculation pipe connecting said exhaust gas pipe with said suction pipe; and
   an automatic control device which controls exhaust gas recirculation during a first low load-rotational speed range of said internal combustion engine and which automatically controls a charging pressure in the suction pipe during a second higher load-rotational speed range of the internal combustion engine, said automatic control device including a first controller providing a first output for varying the cross-section of the turbine in response to a command variable for adjustment of an exhaust gas recirculation delivery gradient to provide exclusive control of said exhaust gas recirculation control from said air flow sensor in the suction pipe during operation of said engine in said first low load-rotational speed range and wherein said first controller provides a second output for the variation of the cross-section of the turbine in response to a command variable from said pressure sensor for automatic charging pressure control during the second higher load-rotational speed range of said engine.

2. The system according to claim 1, wherein an exhaust gas recirculation valve is provided in the exhaust gas recirculation pipe, said valve being adjustable by a second controller constructed as an exhaust gas recirculation controller.

3. The system according to claim 2, wherein the second controller has the air flow rate as a command variable.

4. The system according to claim 2, further including means for deactivating the second controller during a transition from the second to the first load rotational speed range.

5. The system according to claim 4, wherein, during the deactivating of the second controller, if the exhaust gas recirculation valve has reached a predetermined actual value, the valve retains that predetermined value after deactivating of the second controller.

6. The system according to claim 5, further including means for deactivating the first controller in the first load rotational speed range when its minimal output is reached and for the simultaneous switching-on or activating of the second controller.

7. The system according to claim 4, further including means deactivating the first controller in the first load rotational speed range when its minimal output is reached and for the simultaneous switching-on or activating of the second controller.

8. The system according to claim 1, further including means for the change-over of the first controller between the air flow rate command variable and the charging pressure command variable when a boundary line is exceeded between the first and second load-rotational speed ranges.

9. The system according to claim 1, wherein the air flow rate sensor is constructed as a hot-film air flow rate senor.

10. The system according to claim 1, wherein the turbine of the exhaust gas turbocharger arranged in the exhaust gas pipe has a guide blade adjusting device for the variation of the turbine cross-section.

11. The system according to claim 1, wherein said pressure sensor for measuring the charging pressure is connected downstream of the compressor of the exhaust gas turbocharger.

12. The system according to claim 1, wherein a boundary between said first and second load-rotational speed ranges is defined by a characteristic curve.

13. The system according to claim 12, wherein the characteristic curve has a hysteresis.

14. The claim according to claim 1, wherein the internal-combustion engine is a diesel engine.

15. An automatic charging pressure control and automatic exhaust gas recirculation control system for an internal-combustion engine, comprising:
   an exhaust gas turbocharger having a compressor and a turbine, said turbine having a variably adjustable cross-section;
   an engine suction pipe, said compressor of the turbocharger being arranged in the section pipe;
   an air flow sensor arranged upstream of the compressor in the suction pipe;
   a pressure sensor connected in line with said suction pipe for measuring charging pressure;
   an engine exhaust gas pipe in which the variably adjustable turbine is arranged;
   an exhaust gas recirculation pipe connecting the exhaust gas pipe with the suction pipe;
   an automatic control device which, in a first low load rotational speed range, automatically controls the exhaust gas recirculation and, in a second higher load rotational speed range, automatically controls the charging pressure in the suction pipe by a corresponding variation of the variably adjustable turbine cross-section;
   wherein the automatic control device comprises a first controller having a controller output for controlling the variably adjustable turbine cross-section such that, in the first low load rotational speed range, an air flow rate value from the air flow sensor functions as a command variable for adjustment of an exhaust gas recirculation delivery gradient to provide exclusive automatic exhaust gas recirculation control during said low load rotation speed range and, in the second higher load rotational speed range, a charging pressure in the suction pipe functions as the command variable for the automatic charging pressure control.

16. The system according to claim 15, wherein the internal-combustion engine is a diesel engine.

17. The system according to claim 15, further comprising an exhaust gas recirculation valve provided in the exhaust gas recirculation pipe; and
- a second controller of the automatic control device functioning as an exhaust gas recirculation controller for variably adjusting the exhaust gas recirculation valve.

18. The system according to claim 17, wherein the second controller receives the air flow rate value as the command variable.

19. The system according to claim 17, further comprising means for or deactivating the second controller during a transition from the second to the first load rotational speed range.

20. The system according to claim 19, wherein during deactivating of the second controller, if the exhaust gas recirculation valve has reached a predetermined actual value, the valve retains that value after deactivating of the second controller.

21. The system according to claim 19, further comprising means for deactivating the first controller in the first load rotational speed range when a minimal output is reached, and for simultaneously switching-on or activating the second controller.

22. A method for performing automatic charge pressure control and automatic exhaust gas recirculation control in an internal-combustion engine having an exhaust gas turbocharger with a compressor and a variably adjustable turbine, the method comprising the acts of:
- varying a cross-section of the variably adjustable turbine arranged in an exhaust gas pipe of the engine via a controller output from a first controller, which output is based upon a first command variable, for adjustment of an exhaust gas recirculation delivery gradient to provide exclusive automatic exhaust gas recirculation control in a first low load rotational speed range which first command variable is based on an air flow rate value from an air flow sensor arranged in a suction pipe of the internal combustion engine; and
- varying the cross-section of the variably adjustable turbine based upon a second command variable to provide automatic charging pressure control in a second higher load rotational speed range, said second command variable being based on a charging pressure in the suction pipe.

\* \* \* \* \*